United States Patent
Fjeldheim et al.

(10) Patent No.: US 12,227,360 B2
(45) Date of Patent: Feb. 18, 2025

(54) SYSTEM AND METHOD FOR MONITORING ATMOSPHERIC CONDITIONS IN AN AUTOMATED STORAGE AND RETRIEVAL SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 223 days.

(21) Appl. No.: 17/758,846

(22) PCT Filed: Jan. 27, 2021

(86) PCT No.: PCT/EP2021/051791
§ 371 (c)(1),
(2) Date: Jul. 14, 2022

(87) PCT Pub. No.: WO2021/151911
PCT Pub. Date: Aug. 5, 2021

(65) Prior Publication Data
US 2023/0040663 A1    Feb. 9, 2023

(30) Foreign Application Priority Data

Jan. 31, 2020 (NO) .................................. 20200123

(51) Int. Cl.
*G01D 21/02* (2006.01)
*B65G 1/137* (2006.01)

(52) U.S. Cl.
CPC ........... *B65G 1/1375* (2013.01); *G01D 21/02* (2013.01)

(58) Field of Classification Search
CPC .. B65G 1/1375; B65G 1/0464; B65G 1/0478; B65G 1/065; B65G 1/1378;
(Continued)

(56) References Cited

U.S. PATENT DOCUMENTS

2019/0263589 A1* 8/2019 Clarke ................. B65G 1/0464
2021/0309459 A1* 10/2021 Clarke ................. E04B 2/7403

FOREIGN PATENT DOCUMENTS

| CN | 1248954 A | 3/2000 |
|----|-----------|--------|
| CN | 107466333 A | 12/2012 |

(Continued)

OTHER PUBLICATIONS

International Search Report issued in International Application No. PCT/EP2021/051791, mailed Apr. 13, 2021 (4 pages).
(Continued)

*Primary Examiner* — Robert R Raevis
(74) *Attorney, Agent, or Firm* — Baker Botts L.L.P.

(57) ABSTRACT

A measuring system for monitoring atmospheric conditions in an automated storage and retrieval system including a framework structure. The framework structure forms a three-dimensional storage grid structure for storing storage containers for storing items. The grid structure forms vertical storage columns each having a horizontal area defined by the size of an access opening of the vertical storage columns. A rail system is arranged on the framework structure defining the circumference of each access opening on top of each storage column. The rail system provides available routes for container handling vehicles handling and transferring the storage containers to and from the storage columns. The at least one container handling vehicle has at least one rechargeable power source. A container handling platform has a first set of grippers for handling the storage containers. The measuring system includes at least one box-shaped
(Continued)

measuring unit of the same size and features as a storage container. The box-shaped measuring unit includes measuring equipment for measuring at least one atmospheric condition within the grid structure, a transmitter for transmitting measurement data to a computer system, at least one rechargeable power source, and a data recorder for recording the measurement data. The box-shaped measuring unit includes at least one piece of measuring equipment on all sides of the box-shaped measuring unit.

24 Claims, 6 Drawing Sheets

(58) Field of Classification Search
CPC ...... B65G 2201/0258; B65G 2203/042; B65G 1/04; B65G 1/1273; B65G 1/1371; G01D 21/02
USPC ....... 73/23.31, 29.01, 335.01–335.14, 31.01, 73/31.02, 865.8; 374/141–143, 166, 167, 374/310; 62/125–131, 331 J
See application file for complete search history.

(56) References Cited

FOREIGN PATENT DOCUMENTS

| | | | |
|---|---|---|---|
| CN | 104837747 | A | 8/2015 |
| CN | 106660703 | A | 5/2017 |
| CN | 206573554 | U | 10/2017 |
| CN | 206909217 | U | 1/2018 |
| CN | 109688802 | A | 4/2019 |
| CN | 110065751 | A | 7/2019 |
| EP | 3326452 | B1 | 5/2018 |
| JP | 3213717 | U | 11/2017 |
| NO | 317366 | B1 | 10/2004 |
| WO | 2014090684 | A1 | 6/2014 |
| WO | 2015193278 | A1 | 12/2015 |
| WO | 2016166354 | A1 | 10/2016 |
| WO | 2019115556 | A1 | 6/2019 |
| WO | WO-2020144269 | A1 * | 7/2020 ............. A01G 31/06 |

OTHER PUBLICATIONS

Written Opinion issued in International Application No. PCT/EP2021/051791; Dated Apr. 13, 2021 (9 pages).
Search Report issued in Norwegian U.S. Appl. No. 20/200,123; Dated Aug. 12, 2020 (2 pages).
Teng Yuhong, First Office Action for Chinese Patent Application No. 2021800119606, dated Mar. 30, 2024, 15 pages, pub.by SIPO, Beijing, China.
Le Huy Anh, Office Action for Vietnamese Patent Application No. VN1202204627, dated Sep. 27, 2024, 4 pages, pub. by The Intellecutal Property Office of Vietnam, Ha Noi, Vietnam.
Thibaut, Charles, Office Action for European Patent Application No. EP21702901.6 dated Sep. 20, 2024, 7 pages, pub. by the EPO, Rijswijk Netherlands.
Agnes Wittmann-Regis, International Preliminary Report on Patentability for Application No. PCT/EP2021/051791, mailed Aug. 11, 2022, 11 pages, pub. by The International Bureau of WIPO, Geneva, Switzerland.

* cited by examiner

SYSTEM AND METHOD FOR MONITORING ATMOSPHERIC CONDITIONS IN AN AUTOMATED STORAGE AND RETRIEVAL SYSTEM

TECHNICAL FIELD

The present invention relates to a system and method for performing measurements in an automated storage system, and more specifically a system and method for performing measurements in an automated storage system using a box that can be placed in the storage system and that comprises measuring equipment.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises several upright members 102 and several horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body, and first and second sets of wheels which enable the lateral movement of the container handling vehicles 201, 301 in the X direction and in the Y direction, respectively. In FIG. 2 and FIG. 3 two wheels in each set are fully visible.

The first set of wheels is arranged to engage with two adjacent rails of the first set 110 of rails, and the second set of wheels is arranged to engage with two adjacent rails of the second set 111 of rails. Each set of wheels can be lifted and lowered, so that the first set of wheels and/or the second set of wheels can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

In the X and Y directions, neighboring grid cells are arranged in contact with each other such that there is no space there-between.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers 106 prior to lifting the target storage container 106 from the storage column 105. This step, which is sometimes referred to as "digging" within the art, may be performed with the same container handling vehicle that is subsequently used for transporting the target storage container 106 to the drop-off port 119, or with one or a plurality of other cooperating container handling vehicles. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers 106 positioned at or above the target position within the storage column stack 107 have been removed, the container handling vehicle 201, 301 positions the storage container 106 at the desired position. The removed storage containers 106 may then be lowered back into the storage column 105 or relocated to other storage columns.

FIG. 4 describes a delivery vehicle. The delivery vehicles comprise a base with the same setup of wheels as on the container handling vehicles. The wheel base unit features a wheel arrangement having a first set of wheels for movement in a first direction upon a rail grid (i.e. any of the top rail grid and the transfer rail grid) and a second set of wheels for movement in a second direction perpendicular to the first direction. Each set of wheels comprises two pairs of wheels arranged on opposite sides of the wheel base unit. To change the direction in which the wheel base unit may travel upon the rail grid, one of the sets of wheels is connected to a wheel displacement assembly. The wheel displacement assembly is able to lift and lower the connected set of wheels relative to the other set of wheels such that only the set of wheels traveling in a desired direction is in contact with the rail grid. The wheel displacement assembly is driven by an electric motor. Further, two electric motors, powered by a rechargeable battery, are connected to the set of wheels to move the wheel base unit in the desired direction. The horizontal periphery of the wheel base unit is dimensioned to fit within the horizontal area defined by a grid cell of the rail grid such that two-wheel base units may pass each other on any adjacent grid cells of the rail grid. In other words, the wheel base unit may have a footprint, i.e. an extent in the X and Y directions, which is generally equal to the horizontal area of a grid cell, i.e. the extent of a grid cell in the X and Y directions, e.g. as is described in WO2015/193278A1, the contents of which are incorporated herein by reference.

A problem with the prior art solutions is that if there are perishable items in the storage there is a need for measuring the freshness of the products and the conditions the items are stored in. There is however a problem with getting accurate readings of the items without having to turn to costly solutions that require expensive equipment or extensive rebuilds. It is therefore an object of the present invention to solve these problems.

SUMMARY OF INVENTION

The present invention is set forth and characterized in the independent claims, while the dependent claims describe other characteristics of the invention.

In one aspect, the invention is related to a measuring system for monitoring atmospheric conditions in an automated storage and retrieval system with a framework structure comprising several upright members and several horizontal members which are supported by the upright members and defines a storage grid comprising storage columns arranged in rows, in which storage columns storage containers are stacked one on top of another to form stacks, and at least one container handling vehicle with at least one rechargeable power source and a lifting frame with grippers for handling containers for storing items, wherein the measuring system comprises a box-shaped measuring unit having same size and features as a container for storing items, however the box-shaped measuring unit also comprises measuring equipment for measuring at least one atmospheric condition, a transmitter for transmitting measurement data to a computer system, and at least one rechargeable power source and a data recorder for recording the measurement data.

The measuring equipment can be a temperature sensor, moisture sensor and/or at least one gas detector. Also, the box-shaped measuring unit can have measuring equipment on all sides of the box-shaped measuring unit. Further, different equipment may be placed on different sides of the box-shaped measuring unit, or that not all the sides have all the measuring equipment.

The measuring system wherein the box-shaped measuring units can have an RFID reader on one side.

Further, the box-shaped measuring unit can be provided with a removable lid for giving access to the measuring equipment inside the box-shaped measuring unit. The main rechargeable power source of the box-shaped measuring unit can be placed in the lid of the box-shaped measuring unit. In order to hold the lid in place on the box of the box-shaped measuring unit, the lid can be supplied with a set of grippers, gripping the box of the box-shaped measuring unit. These grippers can be remotely controlled by the central computer system.

Further the at least one rechargeable power source of the measuring system can be charged via an interface to the lifting frame of the container handling vehicle.

In an alternative solution the measuring system can have a back-up rechargeable power source placed inside the box-shaped measuring unit. This back-up power supply can be adapted to provide power to the measuring equipment inside the box-shaped measurement unit when the lid is off.

In an alternative solution there are placed a plurality of box-shaped measuring units in the storage system and the box-shaped measuring units can communicate with other box-shaped measuring units within the same automated storage system.

A further aspect of the invention is related to a method for monitoring atmospheric conditions in an automated storage system comprising a three-dimensional grid of an underlying storage system, at least one container handling vehicle, with at least one rechargeable power source, and a lifting frame with a first set of grippers for handling containers for storing items wherein the method comprises the steps of placing a box-shaped measuring unit comprising equipment for measuring the atmospheric conditions surrounding the box-shaped measuring unit in the three-dimensional grid, recording data gathered by the measuring equipment inside the box-shaped measuring unit, and transmitting the measurement data to a central computer system.

Further it is possible to charge the at least one rechargeable power source of the box-shaped measuring unit via the lifting frame of the container handling vehicle. In this solution the rechargeable power supply of the container handling vehicle is used to top up the rechargeable power supply of the box-shaped measuring unit.

Further a set of grippers of the lid of the box-shaped measuring unit can be remotely controlled by the central computer system.

Also, the back-up power supply can direct power to the measuring equipment connected to the box-shaped measuring unit if the lid is off.

In an alternative solution the measurement data collected by the measuring equipment can be transferred from the box-shaped measuring unit to the container handling vehicle when said vehicle is handling the box-shaped measuring unit.

BRIEF DESCRIPTION OF THE DRAWINGS

The following drawings are appended to facilitate the understanding of the invention. The drawings show embodiments of the invention, which will now be described by way of example only, where.

DETAILED DESCRIPTION

Figure 1:
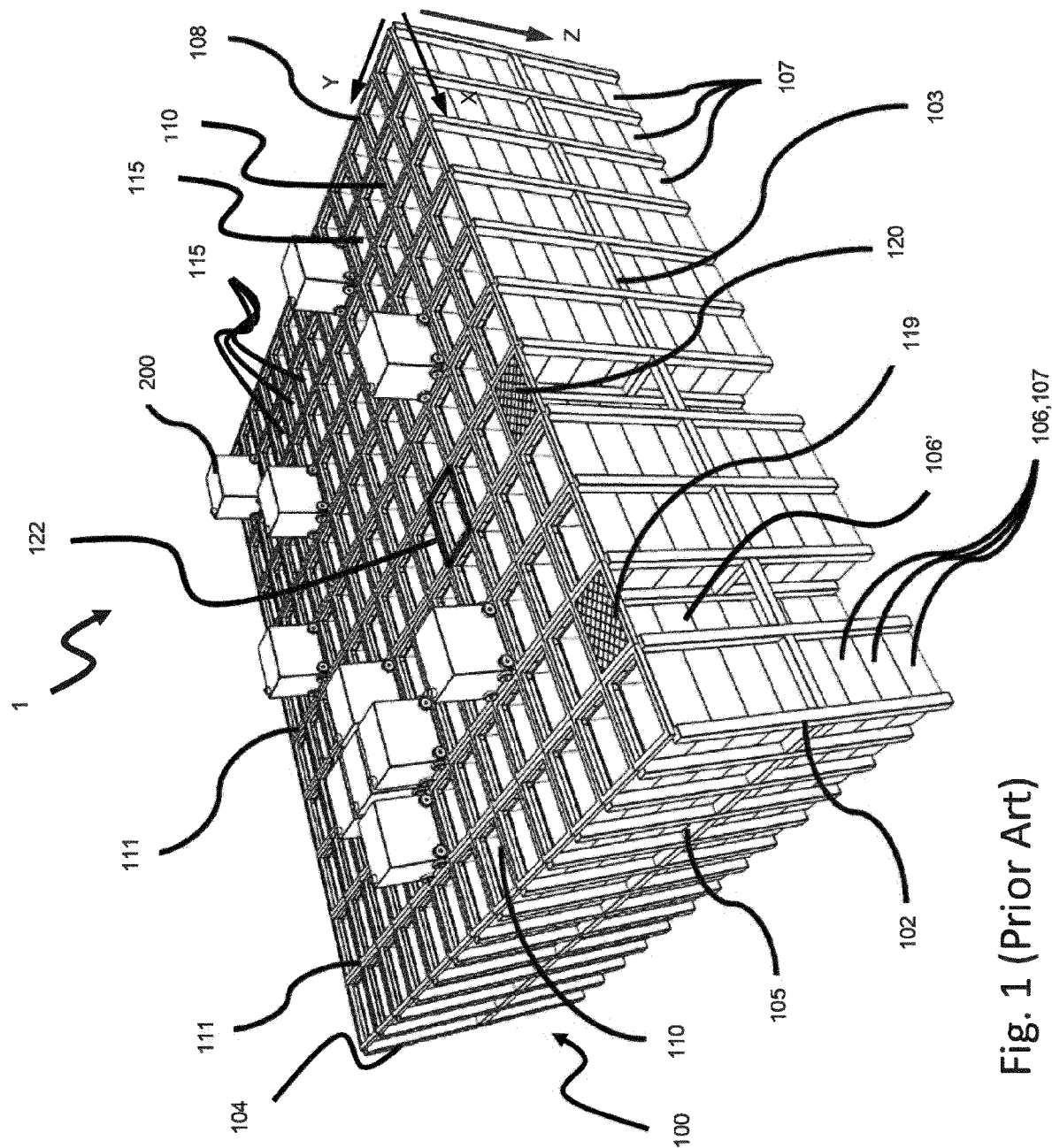
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figure 2:
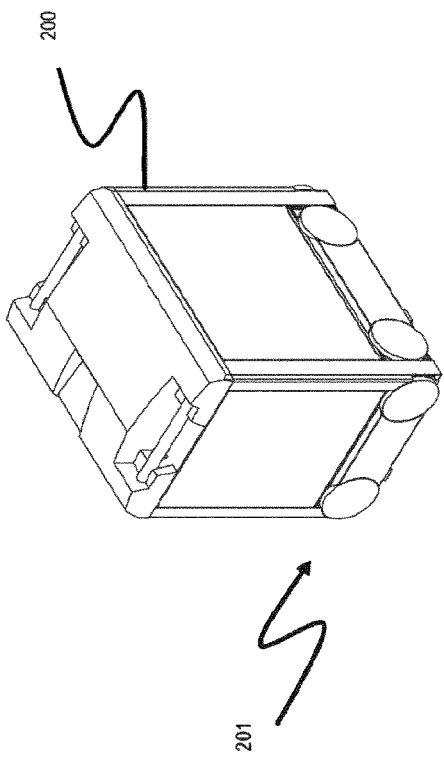
FIG. 2 is a perspective view of a prior art container handling vehicle having a centrally arranged cavity for carrying storage containers therein.

FIG. 2 is an alternative solution of a container handling vehicle 201 with a central cavity solution.

Figure 3:
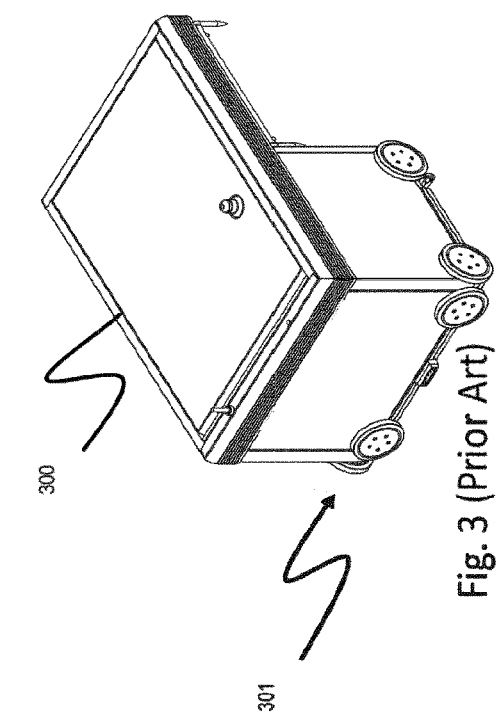
FIG. 3 is a perspective view of a prior art container handling vehicle having a cantilever for carrying storage containers underneath.

FIG. 3 shows an alternative configuration of a container handling vehicle 301 with a cantilever construction.

Figure 4:
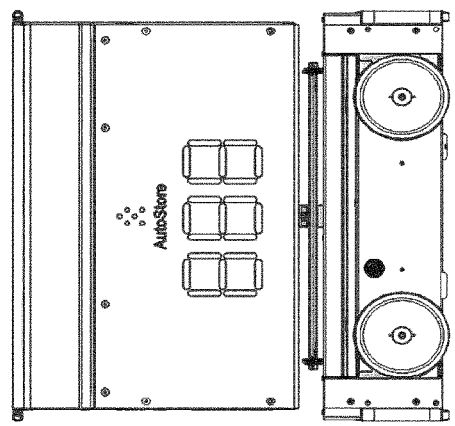
FIG. 4 is a side view of a delivery vehicle.

FIG. 4 describes a delivery vehicle. The delivery vehicles comprise a base with the same setup of wheels as on the container handling vehicles. The wheel base unit features a wheel arrangement having a first set of wheels for movement in a first direction upon a rail grid (i.e. any of the top rail grid and the transfer rail grid) and a second set of wheels for movement in a second direction perpendicular to the first direction. Each set of wheels comprises two pairs of wheels arranged on opposite sides of the wheel base unit. To change the direction in which the wheel base unit may travel upon the rail grid, one of the sets of wheels is connected to a wheel displacement assembly. The wheel displacement assembly is able to lift and lower the connected set of wheels relative to the other set of wheels such that only the set of wheels traveling in a desired direction is in contact with the rail grid. The wheel displacement assembly is driven by an electric motor. Further, two electric motors, powered by a rechargeable battery, are connected to the set of wheels to move the wheel base unit in the desired direction. The horizontal periphery of the wheel base unit is dimensioned to fit within the horizontal area defined by a grid cell of the rail grid such that two-wheel base units may pass each other on any adjacent grid cells of the rail grid. In other words, the wheel base unit may have a footprint, i.e. an extent in the X and Y directions, which is generally equal to the horizontal area of a grid cell, i.e. the extent of a grid cell in the X and Y directions.

One embodiment of the automated storage and retrieval system according to the invention will now be discussed in more detail with reference to FIGS. 5-8.

Figure 5:
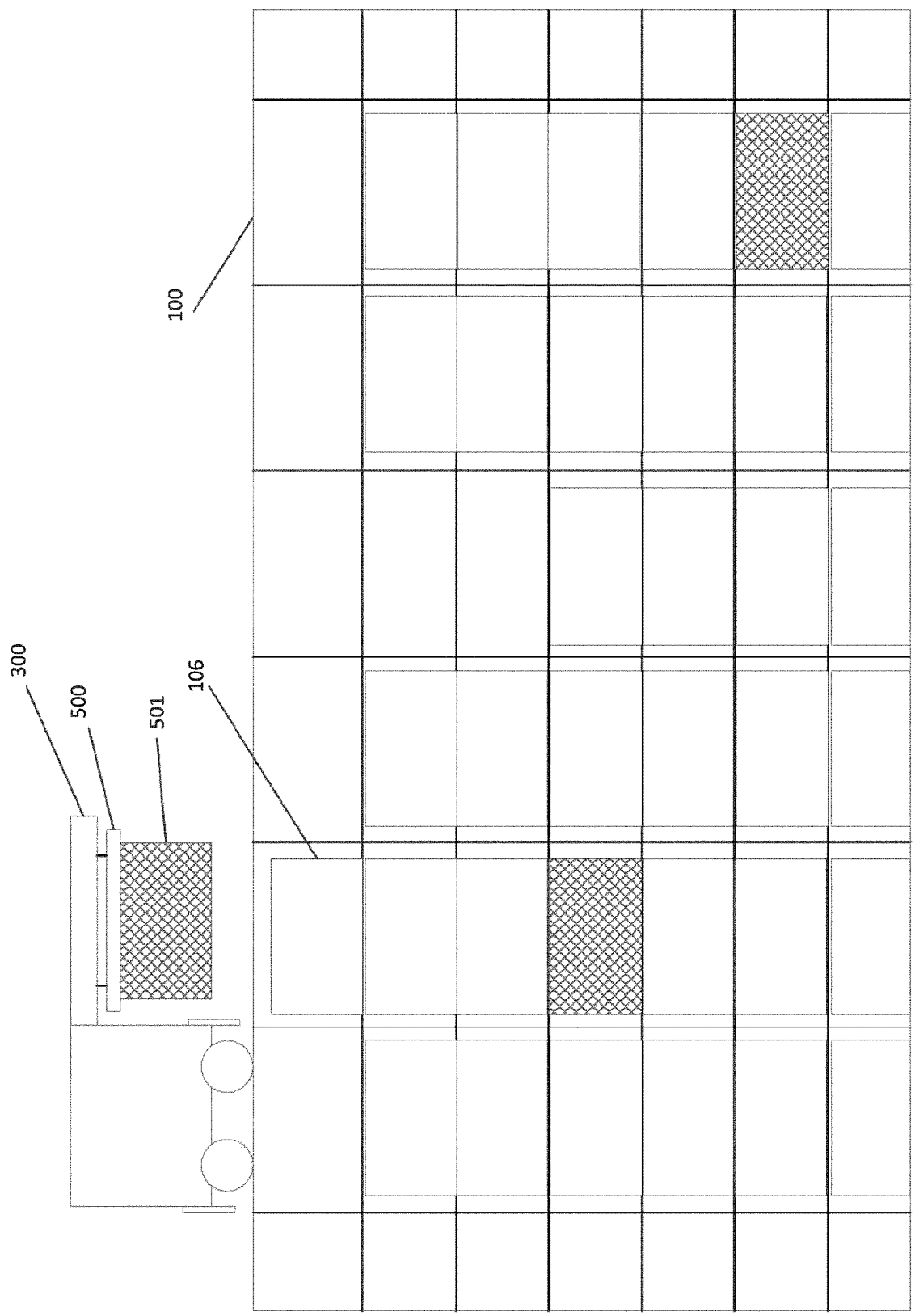
FIG. 5 is a side view of a storage system with storage containers wherein a container handling vehicle transports a box-shaped measuring unit into the storage system.
Figure 6:
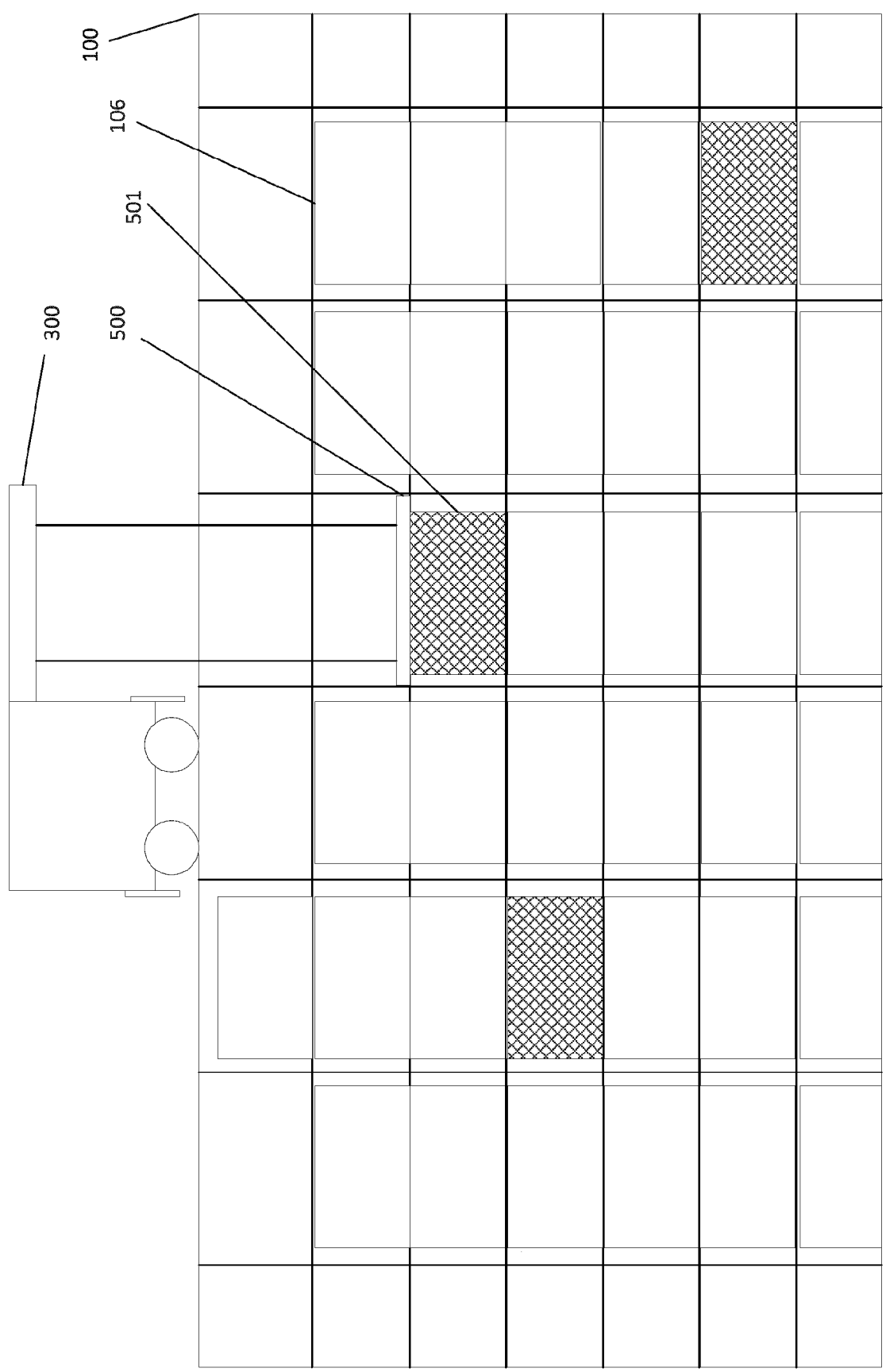
FIG. 6 is a side view of a storage system with storage containers wherein a container handling vehicle places the box-shaped measuring unit at a strategic place in the storage unit.
Figure 7:
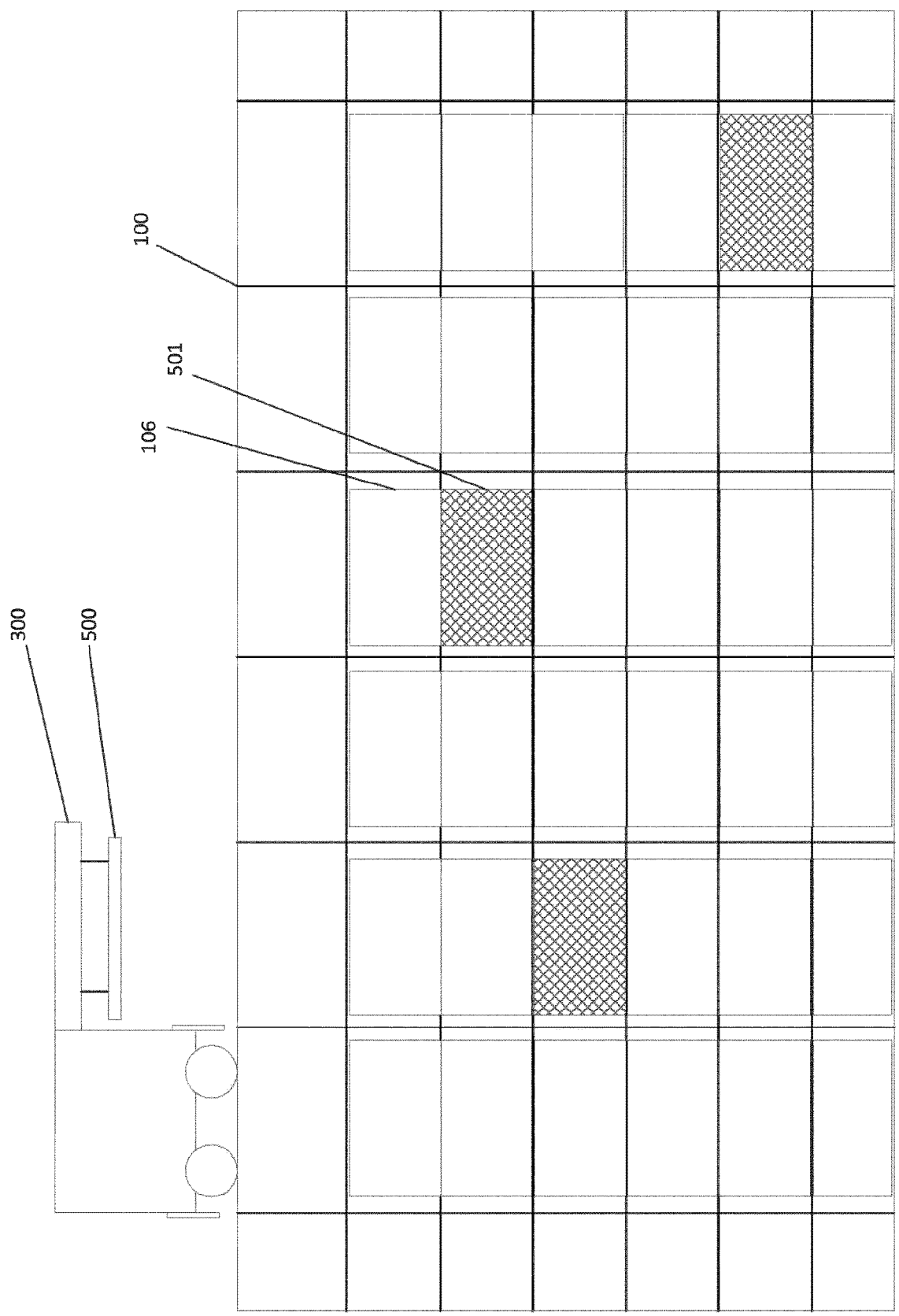
FIG. 7 is a side view of a storage system with storage containers wherein a container handling vehicle places the box-shaped measuring unit at a strategic place in the storage unit.

FIG. 5-7 are side views of a storage system with storage containers wherein a container handling vehicle transports a box-shaped measuring unit 501 into the storage system, places it at a predetermined position within the storage system and leaves. The predetermined position is where the box-shaped measuring unit 501 can have the most effect in detecting anomalies within the storage system. The position can be either at a certain level of the storage system (for example, towards the top or upper part of the storage system, or towards the bottom or lower part of the storage system) and/or at a certain distance from other box-shaped measuring units 501 in the storage system (for example, in order to triangulate a location of a problem within the storage system).

Further the position can be in order to detect specific atmospheric conditions like specific gasses. Since some of the gasses produced by decomposing or rotting food items are lighter than air and some gasses are heavier than air it is essential where the box-shaped measuring units 501 are placed in order to detect decomposing matter. One gas produced by rotting food is methane. Methane is lighter than air and will therefore move upwards. A sensor for measuring methane should therefore be placed as high up in the storage system as possible. Other gasses that are released during the rotting of food are carbon dioxide and hydrogen sulphide. In these cases, the gasses are heavier than air and will collect at the bottom, so sensors for detecting carbon dioxide and hydrogen sulphide should therefore be placed as low to the ground as possible.

Further, since cold air is heavier than warm air there is a benefit of placing a box-shaped measuring unit 501 either high up in the stack of container or low down depending on what you want to detect. If e.g. the intention is to ensure that the storage facility does not get too warm it is essential that the box-shaped measuring unit 501 is placed where the air is the hottest, i.e. the top of the stack of containers. If, however the intention is to ensure that the storage facility does not get too cold the box-shaped measuring unit 501 needs to be placed at the bottom of the stack of containers. If there is a need to ensure that the storage facility is within a certain temperature span, there can be placed one box-shaped measuring unit 501 on the top of the stack of containers and one box-shaped measuring unit 501 at the bottom of the stack of containers. Further it is possible to decide the position based on the proximity to other box-shaped measuring units 501, in order to better be able to pinpoint where there is a problem, or to ensure that the box-shaped measuring units 501 can communicate with each other using a short-range radio network like e.g. Bluetooth.

The box shaped measuring unit 501 comprises measuring equipment. This measuring equipment might be temperature sensors, moistures sensors, gas detectors or any other type of sensors for measuring atmospheric conditions around the box-shaped measuring unit 501. The detectors can detect evidence of decomposing of perishable items or if there are problems with the atmospheric conditions the items are stored in. Sensors can be placed on one or more sides of the box-shaped measuring unit 501. In a preferred embodiment there can be sensors placed on each side of the box-shaped measuring unit 501. This enables it to detect on which side of the box-shaped measuring unit 501 there are signs of problems with either the atmospheric conditions of the storage system or the items stored in the containers. If there are more than one container stored in the storage system, the result from the separate box-shaped measuring units 501 can be used in order to pinpoint where in the grid there is a problem. If two or more box-shaped measuring units 501 can detect on which side of the box e.g. a specific gas is present the central computer system can decide that there is a problem somewhere between these two or more boxes.

The box-shaped measuring unit 501 comprises in addition to the measuring equipment at least one rechargeable power source and at least one form of communication equipment.

In an alternative solution the box-shaped measuring unit 501 is comprised of a top and a bottom part. The top part acts as a lid to the bottom part. Together the size of the top and bottom part may be of the same size as an ordinary storage container in the storage system. The top part can function as a lid keeping the equipment inside the box safe. Further, the lid can comprise a rechargeable power source that gives power to the equipment in the box-shaped measuring unit 501.

By having a rechargeable power source in the lid of the box-shaped measuring unit 501 it is possible to change the power source without having to remove the box-shaped measuring unit 501 from the storage facility. The bottom part of the box-shaped measuring unit 501 can have an auxiliary rechargeable power source that helps to maintain the operation of the box-shaped measuring unit 501 until there is a new lid placed on the bottom part of the box-shaped measuring unit 501. The top and the bottom part of the box-shaped measuring unit 501 can be held together by a second set of grippers. The second set of grippers makes it possible to lift the top and the bottom part of the box-shaped measuring unit 501 by only connecting a first set of grippers to the top part. The second set of grippers are placed in the top part of the box-shaped measuring unit 501 and they are the same as the first set of grippers on the lifting platform of the container handling vehicles. This ensures that both the top and the bottom part of the box-shaped measuring unit 501 can be lifted by ordinary container handling vehicles without having to add additional equipment for handling the box-shaped measuring unit 501 to the container handling vehicles.

Figure 8:
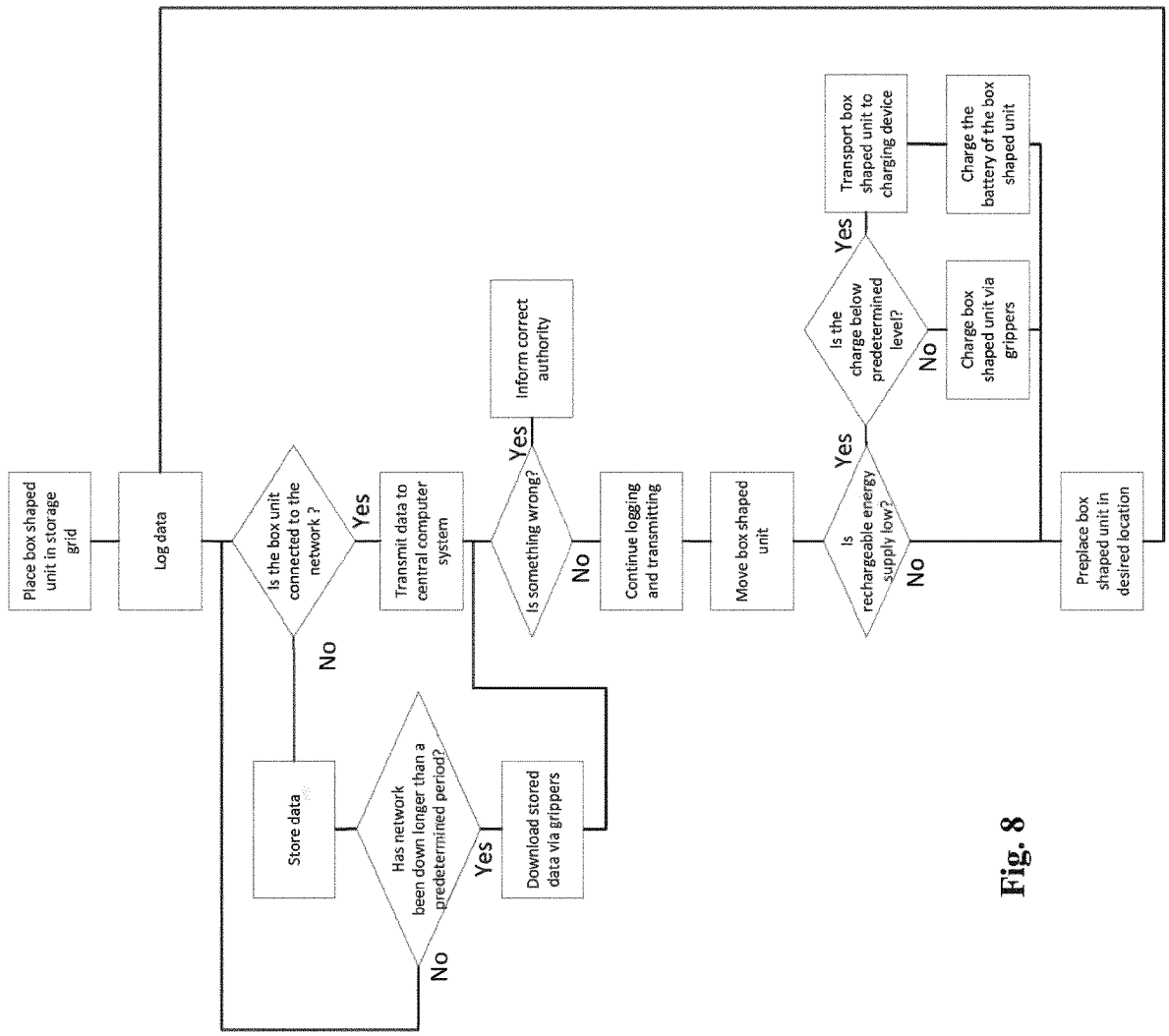
FIG. 8 is a flowchart describing the steps in the process of the embodiments of the present invention

FIG. 8 is a flowchart describing the steps in the process of a preferred embodiment of the present invention. The container handling vehicle places a box-shaped measuring unit 501 in the storage grid. After the box-shaped measuring unit 501 has been placed in the storage grid it starts to gather information (measurement data) from the measuring equipment placed in the box-shaped measuring unit 501. If the box-shaped measuring unit 501 is connected to a network, like Wi-Fi, the gathered information is sent to a computer system. This computer system can be just for keeping track of the measurements of the box-shaped measuring units 501 and analyze the results. And based on the results it can instruct the central computer system to perform certain actions like searching for containers with a potential problem with its items in a certain area of the storage system, or alarming about a rise or fall in temperature.

If the box-shaped measuring unit 501 is not connected to a network the data can be stored in a data recorder within the box-shaped measuring unit 501 and transmitted to the central computer system when the box-shaped measuring unit 501 is connected to the network again. If the box-shaped measuring unit 501 is not connected to a network for longer than a predetermined period of time the data can be uploaded to the computer system when a container handling vehicle is handling the box-shaped measuring unit 501 when the lifting platform of a container handling vehicle is attached to the box-shaped measuring unit 501, the stored measurement data from the measuring equipment can be transmitted to the container handling vehicle, which again can send it to the computer system. The lifting platform of a container handling vehicle can have an interface that connects with the box-shaped measuring unit 501 and hence enables transfer. A reason for the box-shaped measuring unit 501 being disconnected from the network can be that the transmitter or the communication equipment in the box-shaped measuring unit 501 is broken. If this is the case the container handling vehicle can transport the box-shaped measuring unit 501 to a service station for repair. Further the box-shaped measuring unit 501 comprises at least one rechargeable power source. The rechargeable power sources can be batteries or a battery and a capacitor.

When the charge of the power source(s) get low a message is sent to the central computer system that the battery needs to be charged. The central computer system orders a container handling vehicle to pick up the box-shaped measuring unit 501 and transport it to a charger. When finished it is transported back into the storage system.

If the box-shaped measuring unit 501 is made up of a top and a bottom part the top part is transported to the charger and a new top part with a fully charged rechargeable power source is placed on the bottom part of the box-shaped measuring unit 501. In this solution the box-shaped measuring unit 501 does not need to be transported away from its position in the storage facility and it can hence keep measuring and transmitting data continuously. If the box-shaped measuring unit is to be moved to another place in the storage facility the at least one rechargeable power source can be topped up via the lifting platform of the container handling vehicle.

The box-shaped measuring unit 501 can have measuring equipment on all sides. This allows for keeping track of changes in the atmospheric conditions on all sides of the box-shaped measuring unit 501. Further it is possible to better pinpoint where in the storage system there is detected evidence of items going spoiled. If there are more than one box-shaped measuring unit 501 in the storage system, the combined result from all the box-shaped measuring units 501 can make it possible to detect spoiling items before they are able to spoil other items in the storage system.

One solution for keeping track of the changes in atmospheric conditions in the storage system is to record the measurement data from the measuring equipment together with timestamps and transmit the recorded measurement data to a computer system. The time stamp makes it possible to keep track of the development of the measurement data over time. In order to be able to locate where in the storage system there is a problem, the ID of the sensor or the measuring equipment can also be logged. The ID of the sensor or measuring equipment makes it possible to decide which box-shaped measuring unit 501 it is and since the system always knows where in the system any box-shaped measuring unit 501 is, the location of the spoiled item is possible. Also, if there are more than one box-shaped measuring unit 501 the combined results of the measurements from all the separate box-shaped measuring units 501 together with the time stamps allows the computer system to pinpoint where in the system there is a problem.

However, to get as accurate a measurement as possible, it is important that the system knows which way the box-shaped measuring unit 501 is oriented in the storage grid. The ID of the sensor only gives the information that there is a problem close to that sensor, it tells nothing about which way the sensor is pointing. However, there are several ways that can be used to find out which way the box-shaped measuring unit 501 is facing.

One way is to monitor which way the box-shaped measuring unit enters the storage system. Since the container handling vehicles can only move in two directions and since they cannot turn, the direction of the box-shaped measuring unit 501 will not change as long as it is in the storage grid. However, if the box-shaped measuring unit 501 is transported out of the storage system, like when it is charged, or it is in the service station for repair, the direction of the box-shaped measuring unit 501 can change and the direction the box-shaped measuring unit 501 enters the storage system must be noted and fed into the computer system again.

Another way of knowing which way the box-shaped measuring unit 501 is facing is to have a form of ID marker at one end of the storage system. The box-shaped measuring unit 501 has a reader on one side and it can detect the marker if it is facing towards the marker, if the box-shaped measuring unit 501 is not able to detect the marker, is it facing the other way. Since the containers and the box-shaped measuring units 501 are rectangular they can only be stored in two directions. The ID marker can be in the form of the box-shaped measuring unit 501 can communicate with e.g. an RFID mark placed on a specific place in the storage system. The box-shaped measuring unit 501 can have an RF reader on one side and regardless if it gets a result or not, the direction of the box-shaped measuring unit 501 can be determined since if it gets a result, the box-shaped measuring unit 501 is facing one way and if it does not get a result, it is facing the other way.

Alternatively, if there are box-shaped measuring units 501 at regular intervals in the storage system. It is possible to detect where there is a problem if sensors in more than one box-shaped measuring unit 501 gives a result. If more than one box gives a result it is not necessary to know the direction of the box-shaped measuring units 501 since it is safe to say that if two box-shaped measuring units 501 placed close together gets a reading the problem item is somewhere between the two or more units.

In yet another alternative solution the box shaped measuring units themselves can communicate with each other using a short-range telecommunication network like e.g. Bluetooth. If one of the box shaped measuring units gets a reading of something, that box shaped measuring unit can communicate with surrounding box shaped measuring units and tell them to do a measuring to see if they get a reading. If one of them get a reading the problem is somewhere in between these two box shaped measuring units. This solution however requires that there are quite a lot of box-shaped measuring units 501 placed in the storage system in order for more than one box-shaped measuring unit 501 to detect something the distance between the box-shaped measuring units 501 must be quite close together.

LIST OF REFERENCE NUMBERS (FIGS. 1-7):
- 100 Framework structure
- 102 Upright members of framework structure
- 103 Horizontal members of framework structure
- 104 Storage grid
- 105 Storage column
- 106 Storage container
- 106' Particular position of storage container
- 107 Stack
- 108 Rail system
- 110 Parallel rails in first direction (X)
- 111 Parallel rail in second direction (Y)
- 112 Access opening
- 119 First port column
- 120 Second port column
- 201 Prior art storage container vehicle
- 301 Prior art cantilever storage container vehicle
- X First direction
- Y Second direction
- Z Third direction
- 500 Container handling platform
- 501 Box-shaped measuring unit

The invention claimed is:

1. A measuring system for monitoring at least one atmospheric condition in an automated storage and retrieval system comprising a framework structure forming a three-dimensional storage grid structure for storing storage containers for storing items, where the grid structure forms vertical storage columns each having a horizontal area defined by the size of an access opening of the vertical storage columns and where a rail system is arranged on the framework structure defining the circumference of each access opening on top of each storage column, the rail system providing available routes for container handling vehicles handling and transferring the storage containers to and from the storage columns, and the at least one container handling vehicle has at least one rechargeable power source, and a container handling platform with a first set of grippers for handling the storage containers, wherein the measuring system comprises:
   at least one box-shaped measuring unit for being stored in the three-dimensional storage grid structure and wherein the box-shaped measuring unit comprises:
      measuring equipment for measuring the at least one atmospheric condition surrounding the box-shaped measuring unit within the grid structure,
      a transmitter for transmitting measurement data to a central computer system,
      at least one rechargeable power source, and
      a data recorder for recording the measurement data.

2. The measuring system according to claim 1, wherein the at least one rechargeable power source is charged via an interface in the container handling platform of the container handling vehicle.

3. The measuring system according to claim 1, wherein the measuring equipment is a temperature sensor, moisture sensor and/or at least one gas detector.

4. The measuring system according to claim 1, wherein the box-shaped measuring unit has a UVC light source on its bottom pointing downwards.

5. The measuring system according to claim 1, wherein the box-shaped measuring unit comprises a box and a lid.

6. The measuring system according to claim 5, wherein the lid and the box of the box-shaped measuring unit is held together by a second set of grippers.

7. The measuring system according to claim 6 wherein the grippers of the box-shaped measuring unit is remotely controlled by the central computer system.

8. The measuring system according to claim 6, wherein the second set of grippers are mounted to the lid of the box-shaped measuring unit.

9. The measuring system according to claim 5, wherein the lid and the box of the box-shaped measuring unit comprises electric connections for transferring power between them.

10. The measuring system according to claim 9, further comprising a back-up rechargeable power source placed inside the box-shaped measuring unit.

11. The measuring system according to claim 10, wherein the back-up power supply is adapted to provide power to the measuring equipment of the box-shaped measuring unit.

12. The measuring system according to claim 5, wherein a main rechargeable power source of the box-shaped measuring unit is placed in the lid of the box-shaped measuring unit.

13. The measuring system according to claim 1, wherein the container handling platform of a container handling vehicle is configured to receive measurement data from the box-shaped measuring unit and transmit the measurement data to the central computer system.

14. The measuring system according to claim 1, wherein the box-shaped measuring unit is adapted to communicate with other box-shaped measuring units within the same automated storage system.

15. The measuring system according to claim 14, wherein several similar box-shaped measuring units are adapted to communicate with each other via a short range wireless communication network.

16. The measuring system according to claim 14, wherein the box-shaped measuring units are adapted to communicate with the central computer system using a long range wireless communication networks.

17. The measuring system according to claim 14, wherein the box-shaped measuring units are configured to transmit measurement data to each other using a short range wireless network.

18. The measuring system according to claim 1, wherein the box-shaped measuring units have one or more of the same type of measuring equipment on all sides of the box-shaped measuring unit.

19. The measuring system according to claim 1, wherein the box-shaped measuring units have an RFID reader on at least one side.

20. A method for monitoring at least one atmospheric condition in an automated storage and retrieval system comprising a framework structure forming a three-dimensional storage grid structure for storing storage containers for storing items, wherein the grid structure forms vertical storage columns each having a horizontal area defined by the size of an access opening of the vertical storage columns and where a rail system is arranged on the framework structure defining the circumference of each access opening on top of each storage column, the rail system providing available routes for container handling vehicles handling and transferring the storage containers to and from the storage columns, each vehicle comprising a vehicle controller communicating with a central computer system controlling the operation, and the at least one container handling vehicle has at least one rechargeable power source, and a container handling platform with grippers for handling the storage containers, wherein the method comprises:
   placing a box-shaped measuring unit in the three-dimensional storage grid structure, wherein the box-shaped measuring unit has a same size as a storage container and comprises:
      measuring equipment for measuring the at least one atmospheric condition surrounding the box-shaped measuring unit in the three-dimensional grid,
      a transmitter for transmitting measurement data to a computer system,
      at least one rechargeable power source and
      a data recorder for recording the measurement data;
   recording measurement data on the data recorder that has been generated by the measuring equipment inside the box-shaped measuring unit,
   transmitting the measurement data to the computer system.

21. The method according to claim 20, including charging the at least one rechargeable power source of the box-shaped measuring unit via an interface of the container handling platform of the container handling vehicle.

22. The method according to claim 20, including remotely controlling grippers comprised in a lid of the box-shaped unit by means of the central computer system.

23. The method according to claim 22, including directing power from a back-up power supply to the measuring equipment of the box-shaped measuring unit when the lid is off.

24. The method according to claim 20, including transferring the measurement data from the box-shaped measuring unit to the container handling vehicle by means of a first set of grippers of the container handling platform of the container handling vehicle.

* * * * *